W. F. SANDERS.
PLANTER ATTACHMENT.
APPLICATION FILED MAY 2, 1919.
1,332,577. Patented Mar. 2, 1920.
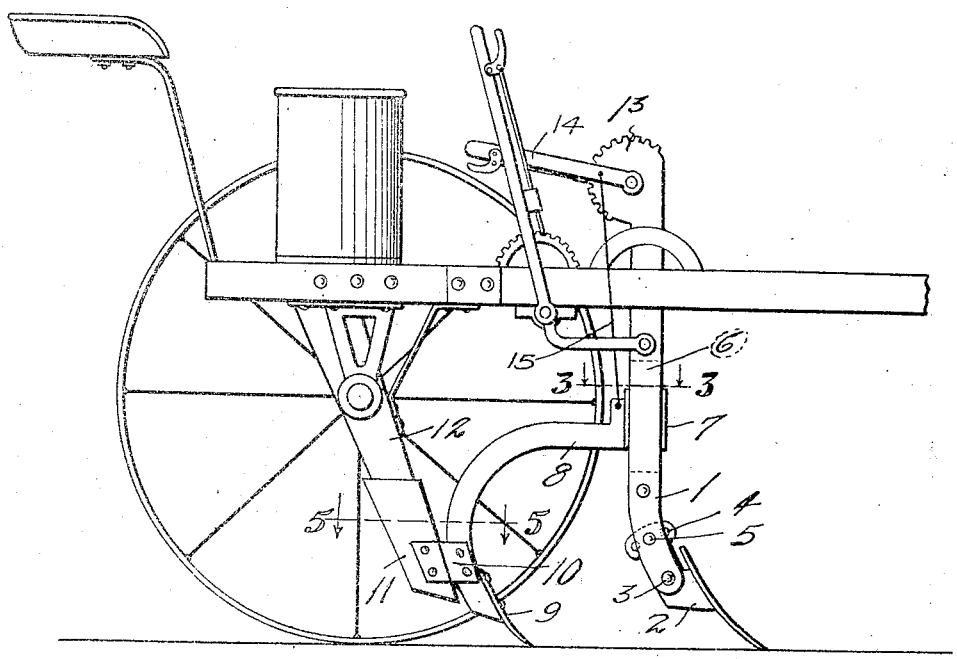
Fig. 1.
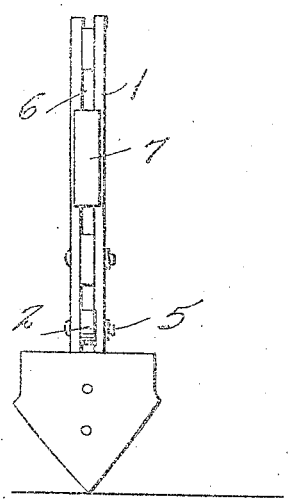
Fig. 2.
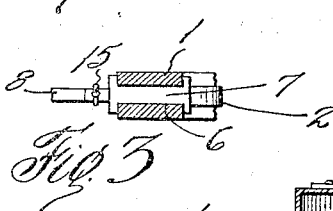
Fig. 3.
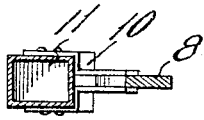
Fig. 5.
Fig. 4.
Inventor
W. F. Sanders.
By Jack A. Kelley
Attorney

UNITED STATES PATENT OFFICE.

WALTER F. SANDERS, OF FROST, TEXAS.

PLANTER ATTACHMENT.

1,332,577. Specification of Letters Patent. Patented Mar. 2, 1920.

Application filed May 2, 1919. Serial No. 294,294.

*To all whom it may concern:*

Be it known that I, WALTER F. SANDERS, a citizen of the United States, residing at Frost, in the county of Navarro and State of Texas, have invented certain new and useful Improvements in Planter Attachments, of which the following is a specification.

This invention relates to new and useful improvements in planters.

In a certain style of seed planter an adjustable main standard or mast is employed. An opening shovel is carried on the standard. A furrow standard extends rearwardly from the main standard and carries a seed or furrow opening shovel. The main shovel and the furrow shovel are adjusted together. The function of the furrow shovel is to make a trench in which the seed is dropped. If it is desired to change the depth of this trench the planter must be stopped, thrown over on one side and the furrow shovel adjusted by loosening the bolts with a wrench.

The purpose of this invention is to overcome the objection and make the furrow shovel adjustable at will, independently of the main standard and while the planter is operating.

In carrying out the invention the furrow standard is made adjustable vertically of the main standard and a lever is provided and attached to the planter. The lever is connected with the furrow standard for adjusting the latter. The arrangement is such as not to alter the angular disposition of the opener shovel when it is adjusted by the lever.

The invention will be more readily understood from a reading of the following specification and by reference to the accompanying drawings, in which an example of the invention is shown and wherein:

Figure 1 is a side elevation of a planter constructed in accordance with my invention, Fig. 2 is a front elevation of the main standard and shovel, Fig. 3 is a cross view on the line 3—3 of Fig. 1, Fig. 4 is a detail of the shank foot, and Fig. 5 is a cross-sectional detail on the line 5—5 of Fig. 1.

In the drawings the numeral 1 designates a vertical main standard which may be suitably adjusted vertically as is now common in the art. The main standard has its lower end bifurcated and receiving a plow foot 2 which is pivoted therein at 3. This plow foot carries a main shovel. The upper end of foot has a series of holes 4 equidistant from the center. A bolt 5 passed through the standard is engaged in one of the holes and by this means the angle of the foot is regulated.

The standard has a vertical slot 6 in which a block 7 is slidably confined. The usual furrow standard 8 is fixed to the block. The standard 8 is curved downward and carries the usual furrow opener or shovel 9. The standard 8 has a bracket 10 which carries an extension 11 of the seed chute 12. When the standard 8 is raised or lowered the extension is carried therewith.

A locking segment 13 is mounted on the upper end of the standard 1. A lever 14 is pivoted concentrically of the segment and has a locking device for engaging the same. A link 15 depends from the lever and has its lower end connected to the arm adjacent the block. It will be seen that if the standard 1 is adjusted the arm and its opener will be carried with it, but by swinging the lever the arm is adjusted vertically. If it should be desired to lessen or deepen the trench which is being formed by the shovel 9, it is merely necessary to swing the lever 14, and this can be done at any time during the operation of the planter and without stopping.

What I claim, is:

In a planter furrow opener adjusting device, a vertically adjustable standard having a slot, a block slidable in the slot, a furrow standard attached to the block and extending rearwardly therefrom, a lever pivoted on the vertically adjustable standard, and a connection between the lever and the block.

In testimony whereof I affix my signature.

WALTER F. SANDERS.